United States Patent [19]

Carlson et al.

[11] Patent Number: 5,147,502
[45] Date of Patent: Sep. 15, 1992

[54] METHOD FOR CONDITIONING BALED WASTEPAPER IN RECYCLING OPERATIONS

[75] Inventors: Willard E. Carlson, Hilton Head Island, S.C.; Ivar H. Stockel, Naples, Fla.

[73] Assignee: Recycle Processes Inc., Naples, Fla.

[21] Appl. No.: 521,361

[22] Filed: May 10, 1990

[51] Int. Cl.$^5$ ............................................... D21B 1/32
[52] U.S. Cl. .......................................... 162/4; 162/8; 241/16; 241/21
[58] Field of Search ............... 162/4, 5, 6, 7, 8, 100; 241/16, 21

[56] References Cited

U.S. PATENT DOCUMENTS

| | | | |
|---|---|---|---|
| 1,640,612 | 8/1927 | McGregor | 162/8 |
| 1,791,445 | 2/1931 | Grenaudier | 162/8 |
| 3,354,028 | 11/1967 | Illingworth et al. | 162/5 |
| 4,013,505 | 3/1977 | Balcar et al. | 162/8 |
| 4,194,968 | 3/1981 | Pfalzer et al. | 162/4 |
| 4,229,493 | 10/1980 | Bendiner et al. | 162/100 |

*Primary Examiner*—Peter Chin
*Attorney, Agent, or Firm*—Willard M. Hanger

[57] ABSTRACT

The invention provides an improvement in the quality and quantity of cellulosic fibers recovered in recycling wastepaper contained in waste material packaged in compressed bale form by sufficiently wetting the baled waste material with a liquid that wastepaper cellulosic fibers will soften and swell prior to the waste material being subjected to the recycling pulping operation. A cellulosic fiber softening and swell-inducing liquid is injected at high velocities into the interior of each unbroken bale by bringing a jet establishing nozzle assembly connected to a high pressure source of the liquid into close adjacency with one or more exterior surfaces of the bale and discharging liquid from the nozzle assembly into the baled waste material for a predetermined time sufficient to wet the waste material, after which time the material in the wetted bale is allowed to sorb the fluid for a period as will result in cellulosic fibers in the waste material softening and swelling a substantial degree before the waste material is introduced into the recycling pulper. For some types of waste material bales superior results are produced by varying the injection velocities during intervals of the predetermined time of liquid injection.

17 Claims, 10 Drawing Sheets

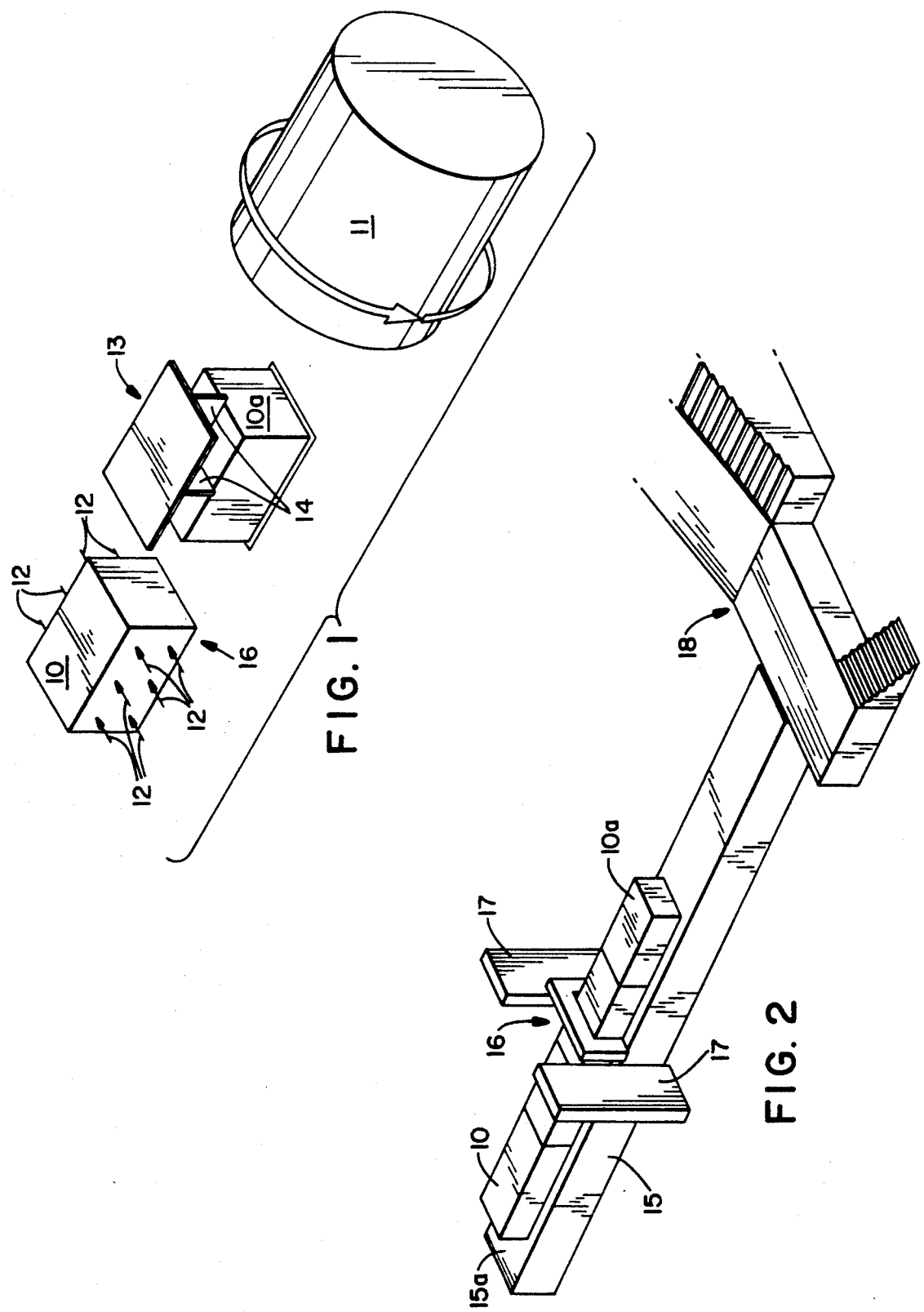

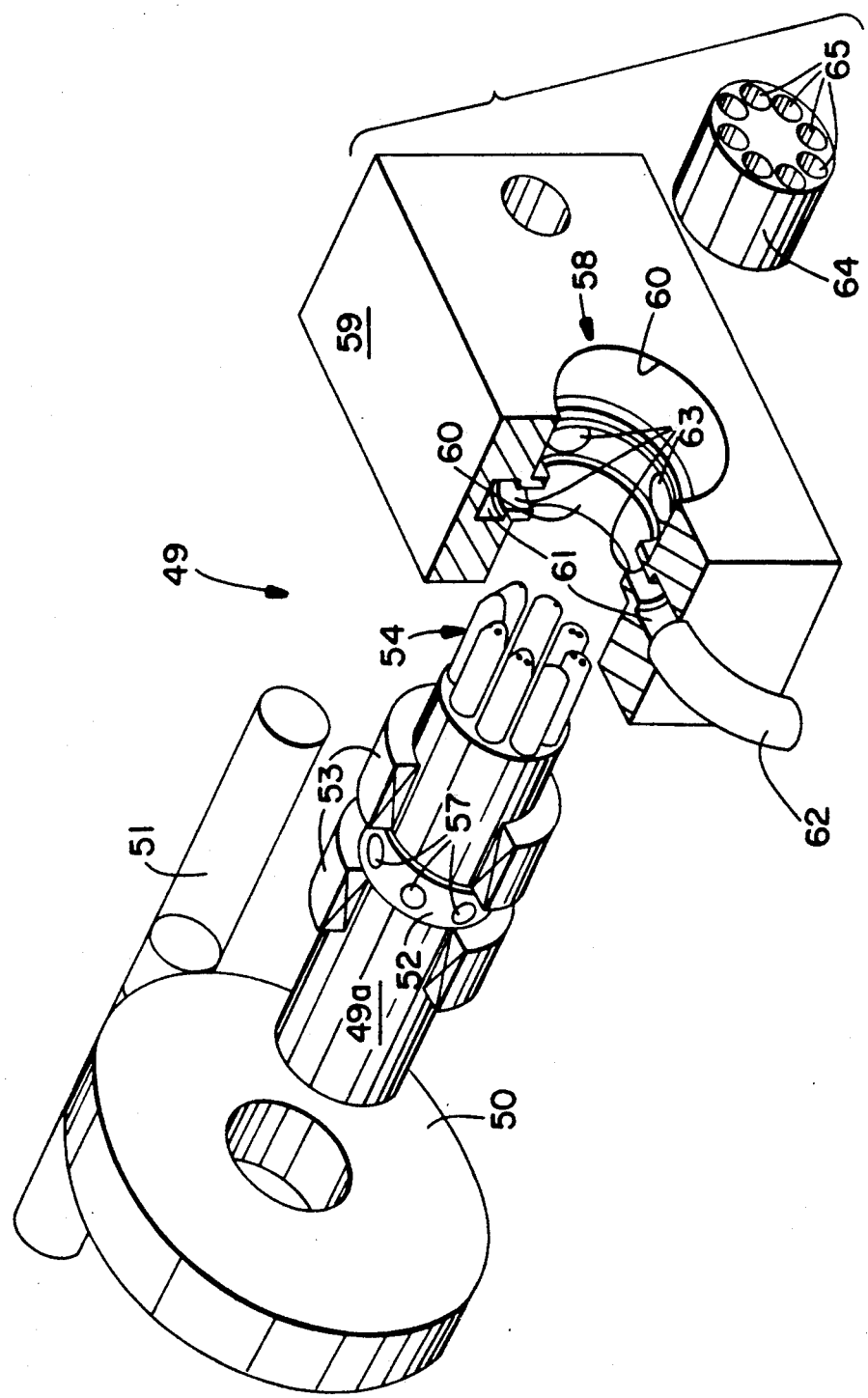

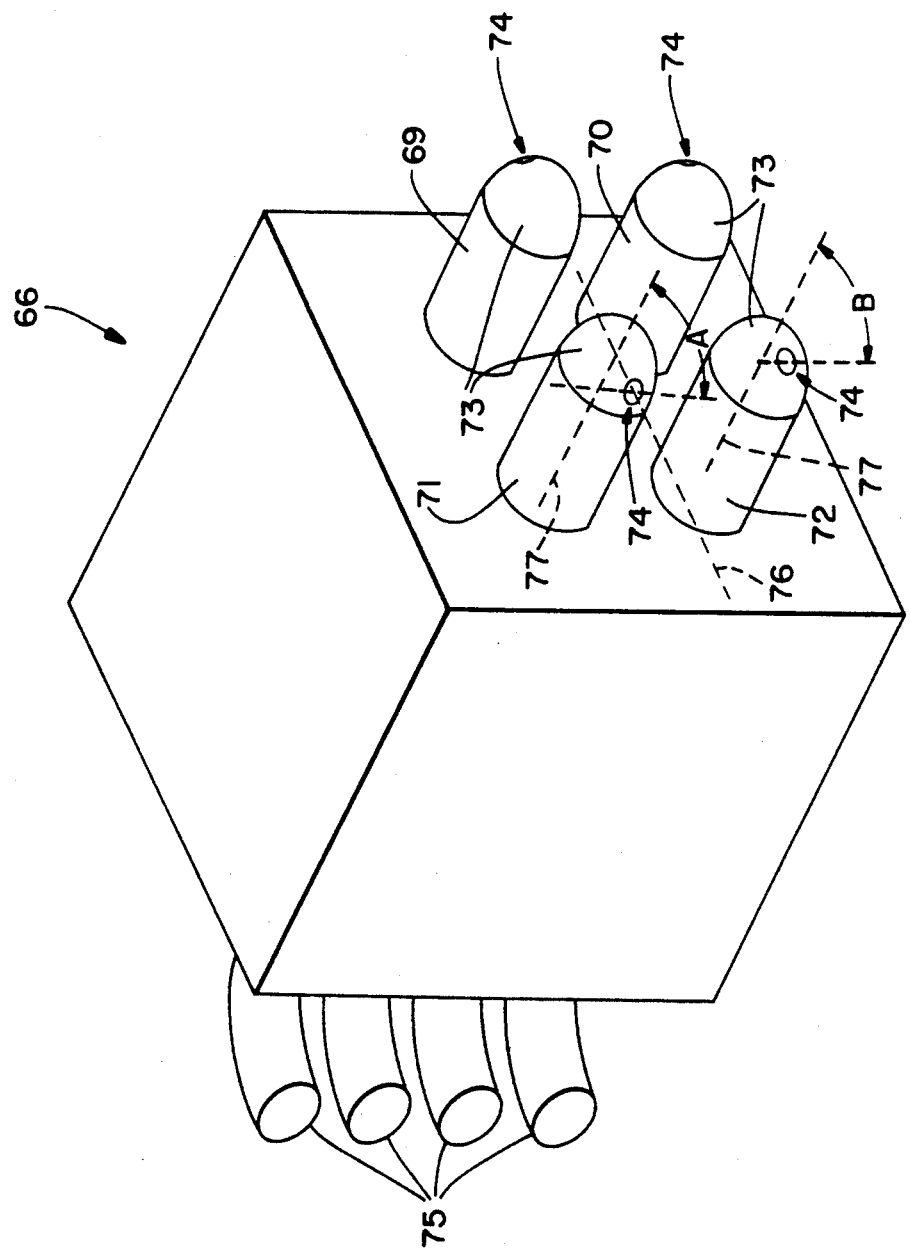

METHOD FOR CONDITIONING BALED WASTEPAPER IN RECYCLING OPERATIONS

BACKGROUND OF THE INVENTION

The present invention relates to an improved method for conditioning wastepaper preparatory to being recycled, particularly the usual form of wastepaper of wide varieties bundled together and contaminated with various other forms of waste material and compactly bound together in compressed bale form.

More specifically the invention relates to conditioning intact bales of waste material, the form in which most recyclable wastepaper is available, in a manner which lowers the costs of recycling the wastepaper recoverable from the baled waste material and enhances the quality of the cellulosic fibers recovered from the wastepaper from which a variety of end products are produced, such as molded pulp products (e.g., egg packaging cartons, food trays, etc.), loose paper articles such as sacks, paperboard, corrugated paper containers, etc.

Waste cellulosic fibrous material suitable for recycling comes from numerous sources. One such source is post-consumer wastepaper which is paper and/or paperboard which has served its useful life and/or served the purpose for which it was intended and has been discarded by the user. Typical post-consumer wastepaper includes used corrugated containers (OCC), old newspapers and magazines, mixed wastepaper, and paper and/or paperboard that may have received special functional treatments such as wax-dipped containers, curtain coated (wax) boxes and plastic coated stock. In addition, recyclable sources of cellulosic fibrous materials may be obtained from in-plant waste and broke, such as DLK clippings and other waste generated by the die cutting process in the manufacture of corrugated containers or other multi-wall corrugated constructions. The broke (i.e., paper or paperboard that has been rejected during the process of manufacture) may take the form of either "wet broke" (paper taken off the wet press of a paper machine) or "dry broke" (paper which is spoiled in going over the dryers or through the calendar, trimmed off in the rewinding of rolls, trimmed from sheet being prepared for shipping, or rejected for manufacturing defects). Other in-plant waste includes rejected paper, sacks, bags, cartons, boxes or other converted paper products. A portion of the wastepaper often contains contaminants comprising ingredients added to the fibrous materials to impart special properties, such as wax or polymers to reduce the water or moisture sensitivity of the fibrous materials, or substances that may have been applied to the dry fibrous products to effect closure, such as sealing tape, staples, hot melt adhesives or latex for sealing closures. Baled waste material available for recycling usually contains other extraneous waste material of a variety which is entirely foreign to the fibrous cellulosic materials sought to be recovered in the recycling process such as plastic containers and film, household garbage, stones, sand and dirt, metal and fiber bodied containers, wire, etc. Thus, bales containing potentially recyclable paper products may contain portions which either do not comprise cellulosic fibers or comprise cellulosic fibers which are contaminated to such an extent that they require extensive agitating pulping operations for defibration to release the individual fibers from their bonding structure to form a slurry, or are not suitable for producing a satisfactory recyclable fibrous material.

Careful sorting, classification and segregation of the delivered bales of waste material into lots comprising wastepaper having the qualities of being readily recyclable in producing high-quality finished fibrous products would be an onerous and economically impossible task by presently existing means. Therefore, great need exists for methods and apparatus that would condition intact bales of unsegregated, mixed paper materials of which some contain unwanted contaminants so that the mass of baled material could be more economically processed into high grade fibrous pulp suitable for producing high quality finished fibrous products.

The basic conventional process for recycling wastepaper involves introducing masses of waste material containing recyclable wastepaper, either as intact or broken bales of dry waste material into a pulper, sometimes referred to as a digester or slusher. Pulpers are of various forms but basically comprise a housing containing water or some form of aqueous solution and having one or more rotors or agitators which serve to agitate the mixture of waste material and water eventually causing most of the fibrous material of the wastepaper to be defibrated. Defibration results in cellulosic fibers being released from the structure holding them together and accumulating as a water suspension of the fibers or slurry which is floated away and separated from the remaining waste material by various well-known separating means such as screens, etc. This slurry is the source for the recycled fibrous material. Wastepaper recycling processes normally include several pulping devices for sequential pulping of the waste material and an assortment of sorting or screen devices in which the contaminants and pulp are segregated in various stages with some of the larger pulped components being returned to initial stages of pulpers for continued agitation and separation of the fibers into a slurry. Typical of wastepaper recycling processes are the installations described in U.S. Pat. Nos. 4,017,033, 4,387,856 and 4,231,526.

In commerce almost all waste material intended for recycling is provided in the form of bales for ease in handling and storage. The bales vary considerably in size, some measuring 48"×32"×39", weighing about 300 to 500 pounds, with other bales weighing between 1,600 to 2,200 pounds or more with typical dimensions of 94"×44"×42". The waste recyclable paper product in these bales has a structural form and integrity. Some wastepaper recycling processes involve a mechanically breaking or tearing apart of the dry waste products in the bales prior to introduction into the pulper which damages the fibers of the fibrous waste. In other instances, intact bales are fed into the pulper resulting in the cellulosic fibers of dry baled material being subject to considerable initial damage by the severe agitation in the pulper required to break up and disintegrate the bale, after which the semi-dry fibrous material is further damaged by the pulper agitation before it separates into a wet slurry and becomes water saturated. Means are needed for conditioning the wastepaper fibers contained in baled material so the fibers suffer minimal damage before and during the pulping proces in order that the strength quality of the fibers comprising the slurry product of the recycling process approaches or equals the cleanliness, color and strength of the original virgin fibrous materials or pulps before their initial conversion into paper or board.

Wastepaper comprises cellulosic fibers that are matted and held together by bonds between the fibers. Hence, if the bonds between fibers are weakened, a lesser mechanical force and agitation is required in a pulper to separate the fibers into the slurry of liquid suspension of fibers. It is known that the bonds between fibers in wastepaper and other fibrous waste are weakened by soaking the fibrous waste in water, or preferably in an alkaline solution, which causes the fibers in the fibrous material to swell hence less friction need be applied to the fibrous material for separating it into individual fibers, thus resulting in minimal damage to the fibers in the pulping action. Accordingly, the liquid suspended fibers of the slurry recovered from the recycled wastepaper contained in baled bundles of waste material would be stronger and be less damaged if the contents of the bales were wetted with water or an aqueous solution to establish swelling of the various waste fibrous materials prior to introducing the baled wastepaper into the recycling pulper. The advantages resulting from injecting a sufficient amount of liquid into baled waste material as will saturate and wet the waste fibrous material prior to introduction of the baled material into the recycling pulper is well illustrated by the following examples. These examples indicate the degree of swelling and resultant loss of fiber to fiber bonding of the fibrous material sought to be recovered from the baled waste material that is achieved when the fibrous material has been impregnated either in water or in a solution of water and ammonium hydroxide. Loss of tensile strength of fluid impregnated fibrous material results from the loss of fiber to fiber bonding strength.

EXAMPLE I

Specimens of 200 pound Kraft container board waste clippings from the manufacture of single wall corrugated containers, generally known as DLK, and measuring 15×180 mm were soaked for time intervals in water or in a water and ammonium hydroxide solution (2% of fiber weight of $NH_3$). After each elapsed time interval, test specimens were removed and tested for strength in accordance with the Technical Association of Pulp and Paper Industry (TAPPI) method T404 om-82, the loss in strength being an indication of the extent of swelling, i.e., debonding, of the cellulosic fibers. The results appear in Table 1, below:

TABLE I

EFFECT OF WETTING ON TENSILE STRENGTH OF "DLK"

| Time Interval | Water Only | Water + Ammonium Hydroxide |
|---|---|---|
| 0 | 84.0 lbs/15 mm | 82.0 lbs/15 mm |
| 1.' | 62.9 lbs/15 mm | 46.0 lbs/15 mm |
| 5.' | 44.0 lbs/15 mm | 13.0 lbs/15 mm |
| 60.' | 20.0 lbs/15 mm | 10.4 lbs/15 mm |
| 120.' | 18.5 lbs/15 mm | 9.6 lbs/15 mm |
| 180.' | 17.7 lbs/15 mm | 10.4 lbs/15 mm |
| 12.0 hr. | 18.4 lbs/15 mm | — |
| 24.0 | 12.5 lbs/15 mm | — |

The above data demonstrate that, after wetting the fibrous material, the loss in strength is accelerated several times when ammonium hydroxide is present in the water as compared to water only. The data show that 5 minutes of impregnating with an equivalent of 40 pounds of ammonia per ton of fiber is equivalent to about 24 hours of impregnating in water only. The "swelled" fiber, whether pretreated for 5 minutes with a water/ammonia solution or for 24 hours with water only, will disperse with much less mechanical energy as compared to similar fibrous material which has not undergone pretreatment due to the reduced tensile strength of the pretreated fibrous material. The benefits of such pretreatment are therefore (1) less energy is required to disperse the swelled fibrous materials, and (2) less damage to the fibers occurs during dispersion due to the reduced energy requirements.

EXAMPLE II

The application of a liquid impregnation pretreatment promotes easier separation of the less swellable contaminated fibrous structures from the more desirable swellable fibrous structures because the less swellable contaminated fibrous materials do not undergo the same strength loss, i.e., fiber to fiber debonding, and tend to maintain their structural integrity. Testing was accomplished in the same manner as in Example I.

TABLE II

EFFECT OF WETTING ON TENSILE STRENGTH OF "OCC"

| OCC | | Water Only | Water + Ammonium Hydroxide 2% of Fiber Weight |
|---|---|---|---|
| DRY | 0 | 126.8 lbs/15 mm | 126.8 lbs/15 mm |
|  | 5.' | 27.1 lbs/15 mm | 20.0 lbs/15 mm |
|  | 60.' | 14.5 lbs/15 mm | 9.4 lbs/15 mm |
|  | 24.0 hr. | 12.9 lbs/15 mm | 7.5 lbs/15 mm |
| WAX DIPPED OCC | | | |
| DRY | 0 | 85.4 lbs/15 mm | 85.4 lbs/15 mm |
|  | 5.' | 81.4 lbs/15 mm | 83.0 lbs/15 mm |
|  | 60.' | 54.6 lbs/15 mm | 49.4 lbs/15 mm |
|  | 24.0 hr. | 32.0 lbs/15 mm | 26.2 lbs/15 mm |
| CURTAIN COATED OCC | | | |
| DRY | 0 | 126.3 lbs/15 mm | 126.3 lbs/15 mm |
|  | 5.' | 115.7 lbs/15 mm | 111.2 lbs/15 mm |
|  | 60.' | 85.7 lbs/15 mm | 73.4 lbs/15 mm |
|  | 24.0 hr. | 40.0 lbs/15 mm | 33.7 lbs/15 mm |

Note: The OCC test specimens were 15×150 mm strips of Kraft combined board; the weight of combined board was not the same because of the wax or coating materials.

The above data illustrate the advantages of a liquid impregnation pretreatment of baled waste material in differentiating between the swellable desirable fibrous structures and the less swellable contaminated fibrous structures; the swellable fiber test specimens retained only 17% of their strength after 5 minutes wetting with ammonium hydroxide solution (21% strength retention for water only) compared to 88-97% strength retention by the wax contaminated test specimens. Thus a liquid impregnation pretreatment makes it easier and less costly to segregate the undesirable wax contaminated fibrous materials from the uncontaminated material since an initial and lower degree of agitation in a recycling pulper would be sufficient to disperse the low strength water swellable fibrous structures but not sufficient to disperse the less swellable wax contaminated fibrous structures.

The very large size and high density of baled waste material and time factors in the recycling process preclude the practicability of placing intact bales of waste material in vats containing a liquid for a sufficient time for the contents of the bale to become wetted prior to being introduced into the pulper. Some degree of presoaking waste material prior to pulping has been practiced as described in U.S. Pat. Nos. 4,566,942 and 4,622,099. However, in these processes, the dry bale of waste material must first be disintegrated and torn apart before the loosened waste material from the bale is introduced into a liquid containing, rotating steeping or mixing container and soaked for a period of time before being fed into a pulper. In such installations, the disintegration of the bale by tearing apart the compacted, dry waste material in the bale damages the fibers of the fibrous material prior to the material being immersed in the liquid of the steeping container. Further, the tumbling action of the rotating soaking container further damages the fibers to some extent.

SUMMARY OF THE INVENTION

The primary object of the applicants' invention is to establish a process and apparatus useful in recycling waste material, containing cellulosic fibrous material, i.e., wastepaper, which is universally packaged in the form of compact bales of miscellaneous waste, whereby the cellulosic fibers contained in the dry, baled waste material in the bales suffer minimal damage during the recycling process in being converted into a slurry of liquid suspended fibers. This object being best achievable through devising a practical manner of saturating the contents of baled waste material with water prior to the introduction into a recycling pulper, the following three trial experiments were conducted impregnating bales of OCC and mixed waste with high pressure water. The pump unit was an NLB 1012D Industrial model which was capable of delivering 16 gpm $\simeq$ 10,000 psi. The one stage pump unit was driven by 120 HP diesel engine. The bale of OCC was 32"×40"×60" and weighed approximately 800 pounds. NLB Corporation, formerly National Liquid Blasting Corporation, is located at 29830 Beck Road, Wixom, Michigan 48096.

Trial I

The initial impregnation trials were made using an NLB-T-3 nozzle with one forward jet and 4 jets at 90° rated to deliver 9 gpm at 10,000 psi. This nozzle was mounted on a seven foot straight lance attached to an NLB Jetting Pistol-Model NCG 205P. The nozzle arrangement was placed against, in contact with and perpendicular to the 32"×60" face of the bale of OCC, and water at 10,000 psi was sprayed against the bale surface. Slight water penetration into the OCC bale was observed with this arrangement.

Trial II

A second trial was made using an NLB-S-1 straight nozzle in contact with the bale face. The S-1 nozzle unit delivering 9 gpm of water at 10,000 psi bored a clean hole in the bale about 11 inches in depth after 20 seconds. The nozzle unit was withdrawn from the bored hole and a T-3 lance of Trial I was attached to the jetting pistol and inserted into the end of this hole for 20 seconds. The hole depth increased to 20 inches. Examination of the bale, after cutting the wires, showed the T-3 nozzle lateral penetration of the bale was only about 3 inches and did not effectively wet large volumes of OCC adjacent to the hole blasted with the S-1 and T-3 nozzle arrangements.

Trial III

A third trial was made using only an NLB-S-1 jetting pistol mounted nozzle placed against the bale face and the water was injected into the 32"×60" face of the OCC bale. The water from the straight nozzle penetrated the bale and, at 16 gpm, 10,000 psi, about 100 pounds of water was introduced into the bale. After about 1 minute water was flowing from the ends of the OCC bale and the trial was ended. In the same manner a mixed waste bale (33"×39"×67") was treated until water flowed from the end of the bale; the treatment time was 2 minutes 15 seconds.

After about one hour the wires on the above treated OCC and mixed waste bales were cut and the contents examined. The front portion of the bales were only partially wetted. However, from about the middle of the bale to the back, the bale of OCC was extensively wetted; estimated to be about a 15 inch laterally extending radius from the water blasted hole. The back side of the mixed waste bale was also wetted extensively. The shavings in the back portion of the bale felt wet when grasped by hand. The high pressure jet of water had blasted a hole about 20 inches in depth and the water then dispersed laterally from the back portion of the hole. Microscopic examination of fiber samples taken adjacent to the water blasted channel and from the surrounding wetted areas showed no differences in the fiber appearance; no fiber damage was apparent as a result of this treatment.

The extensive wetting of the back portion of the OCC bale by the single straight nozzle of Trial III proved that wetting the entire bale could be accomplished by injecting 10,000 psi water from opposite sides and allowing the wetted bale to condition for perhaps 20 to 60 minutes. Another option would be to impregnate the bale in the same manner but increase or decrease the water pressure to vary the hole depth and thereby impregnate both the front and back portions of the bale in one operation. Also, the nozzle on a lance could be inserted into the hole as it is being bored by the high velocity jet and thereby extending the wetted volume further into a bale.

As a result of the previously described and other tests the basic invention of this application has evolved which comprises the liquid impregnation of unbroken bales of waste material preliminary to recycling by injecting high velocity jets of liquid into the bale interior from jet producing sources in substantial contact with or close adjacency to the exterior surface or surfaces of the bale, at least in the initial stage of opening a hole into the bale, and continuing the injection of liquid at a high velocity into the bored hole for a period of time as will provide a sufficient volume of liquid to penetrate and wet the waste material throughout the bale. As will be discussed subsequently in connection with FIG. 7, more widespread and uniform wetting of many types of bale waste material can be achieved by sequentially varying the velocity at which the liquid is injected during this injection period. Following the wetting impregnation the wetted waste material of the bale is allowed to sorb the impregnating liquid for a sufficient time as will soften and cause the cellulosic fibers of the waste material to swell prior to subjecting the waste material to pulping. The disclosed apparatus of the invention comprises a plurality of nozzle units movably supported for movement between the retracted position and an extended position placing the discharge orifices of each nozzle unit in contact with or in close adjacency to an exterior side of a bale with each nozzle unit connected to a high pressure pump source of impregnating liquid via a valving control adapted to establish a high pressure jet discharge from selected nozzle orifices at varying velocities during a predetermined time while the nozzle orifices are in contact with the exterior side surface of the bale.

DESCRIPTION OF THE DRAWINGS

FIG. 1 is a schematic, perspective representation of the basic aspects and features of the invention incorporated into a recycling installation.

FIG. 2 is an outline perspective view of a bale fluid impregnation installation.

FIG. 10 is an exploded perspective view of a third embodiment of a bale fluid impregnation unit.

FIG. 14 is a perspective view of a portion of a unit of FIG. 13.

DESCRIPTION OF THE INVENTION

Figure 3:
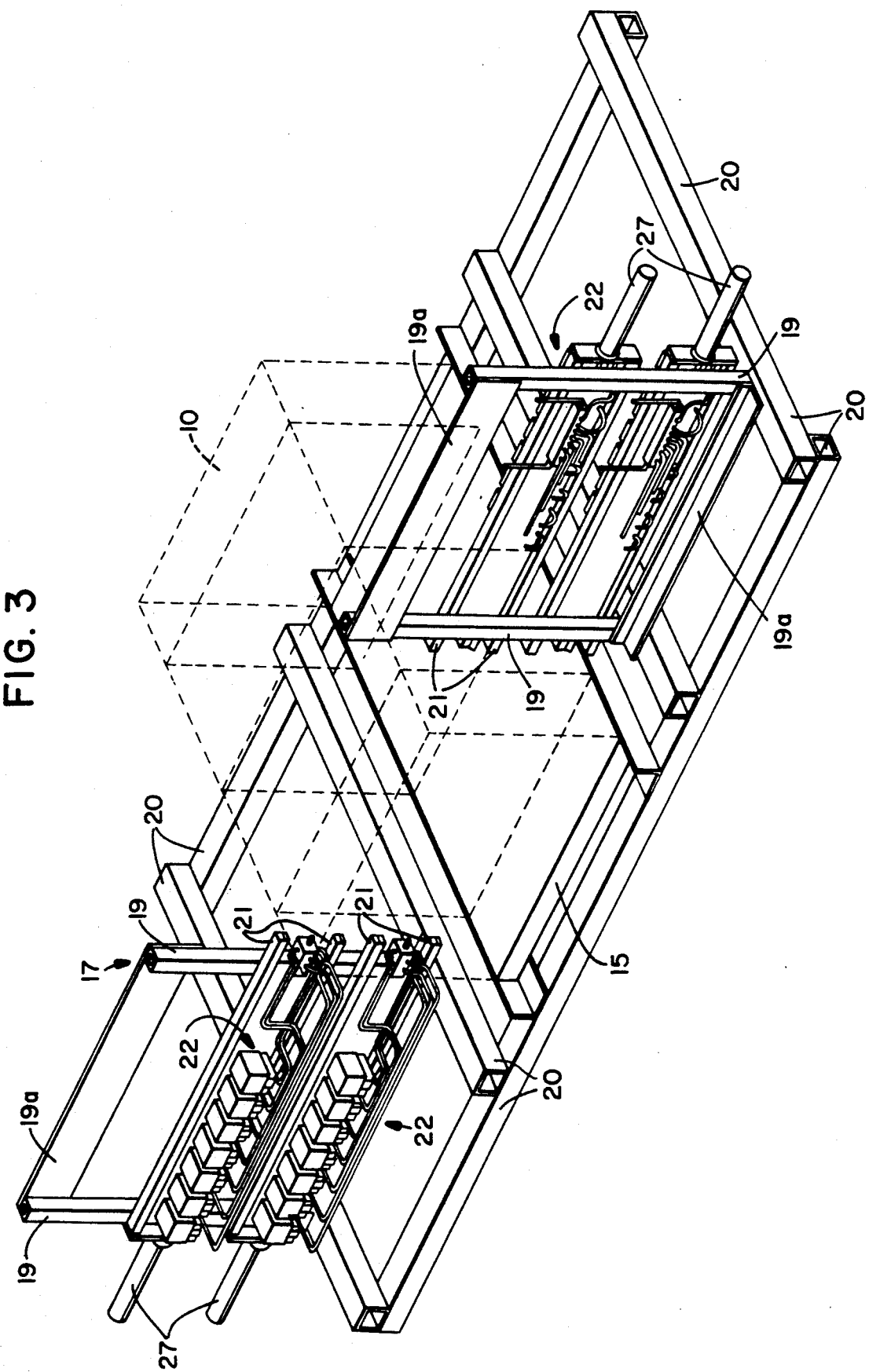
FIG. 3 is a perspective view of a first embodiment of a bale fluid impregnation assembly with the impregnation nozzle units in the extended position for contacting the bale exterior surface.

The basic method of our invention in impregnating the contents of a bale of waste material is to have high velocity liquid jets cut holes into a bale interior from an exterior side or sides of the bale such that the holes extend about 20% to 60% of the distance between opposite sides of the bale. We have discovered that in cutting the hole into the bale interior, the liquid jet loses much of its kinetic energy and subsequently the liquid tends to mushroom transversely of the jet stream oozing outwardly into the bale interior wetting the contents over a volume having as much as a 20 inch diameter cross section. The depth and extent of the wetted area and degree of saturation can be increased by varying and cycling the velocities at which the liquid jets are injected through the exterior sides for penetration into the bales during the impregnation time period. Because of the variation in contents, density and dimensions of baled waste material, the injection pressures can vary over considerable ranges, and also the number of points at which the liquid jets are injected into the exterior sides of the bale.

Tests indicate that a liquid jet injected into a bale through an exterior side surface from a constant displacement pump supplying a flow of 54 gallons per minute through nozzles with orifice sizes that produce 6,000 psi will penetrate over halfway through a baled mixed waste material of a nominal size of 60"×33"×40" in which the bale is layered on the 40" dimension against which the nozzle is placed in contact in directing the jet stream from the nozzle normal to the bale layers. As subsequently described, a nozzle assembly configuration and valving arrangement by which the total orifice area of the multiple orifice nozzle assembly through which the liquid from a constant displacement pump is injected into a bale can be sequentially varied during the impregnation period produces a variation in nozzle back pressure resulting in varying jet velocities and depths of penetration, which produces superior impregnation results. The pump being a positive displacement type, the rate of flow through the varying nozzle orifice areas remains constant during the impregnation period. The description of several preferred embodiments of nozzle designs that will produce varying jet velocities to achieve the desired results follows, although it should be understood that an embodiment in which the nozzle orifice area remains constant will produce satisfactory results in some instances.

FIG. 1 is a schematic representation of the basic aspects of the invention illustrating an intact bale 10 of waste material at an impregnation station 16 of the recycling installation at a location prior to the baled material being introduced into a recycling pulper 11. At the impregnation station 16 a plurality of vertically spaced apart, high velocity liquid jet streams (schematically represented by the arrows 12) are discharged into opposite exterior surfaces of the bale from discharge orifices of nozzle assemblies (subsequently described) which results in the liquid high velocity jets boring into and penetrating into the bale interior until the liquid from the jet becomes dispersed within the bale interior when the kinetic energy of the jet stream becomes dissipated, thereby wetting the waste material throughout the bale. Optimum results are achieved when the discharge orifices of all nozzle assemblies contact or are in close adjacency to the exterior surfaces of the bale at the time liquid is injected into the bale. The waste material is so non-uniform and the exterior surfaces of the bale bulge irregularly to the degree that uniform placement of the nozzle orifice with respect to the exterior surfaces of the baled waste material is not possible at the time the liquid jet streams 12 are injected into the bale. Therefore, a more precise definition for describing the position of each nozzle discharge orifice with respect to the bale exterior surfaces at the time of injection of the liquid jet into the bale is that the orifice is in close adjacency to the bale exterior surface. Some of the orifices might be in light contact with waste material, some might be in hard contact pressing the waste material inwardly, some might have penetrated a small distance into the waste material and some might be spaced a small distance outwardly of the waste material at the time of initial injection. The important aspect of the relative positions of each nozzle orifice and the exterior surface of the baled waste material is that the orifice placement at the time of initial liquid injection and during the injection period is such that the high velocity liquid emerging from the orifice bores a hole into the baled waste material and the liquid of the jet penetrates into the bale interior.

Optionally, a heavy duty press 13 can be located between the impregnation station 16 and the pulper 11 for compressing the liquid soaked bale 10a to improve the micro-distribution of the impregnated liquid throughout the bale, the press also having breaker bars 14 that sever or partially sever the bale binding wires and initiate a break-up of the soaked bale before it enters the pulper 11.

FIG. 2 represents a schematic layout of a bale impregnation system in which a bale conveyor 15 transports the bales 10 along a path from the conveyor entrance end 15a through the impregnation station 16 on either side of which vertically extending nozzle assembly support tiers 17 are located and through which the bales pass, being halted from time to time to receive sequential liquid injections at spaced intervals along their length by nozzle assemblies to be subsequently described, after which the bales are deposited on a conveyor 18 leading to a pulper after a sufficient time period for the bale waste material to soak in the injected liquid for the fibrous cellulosic material to soften and swell.

Figure 4:
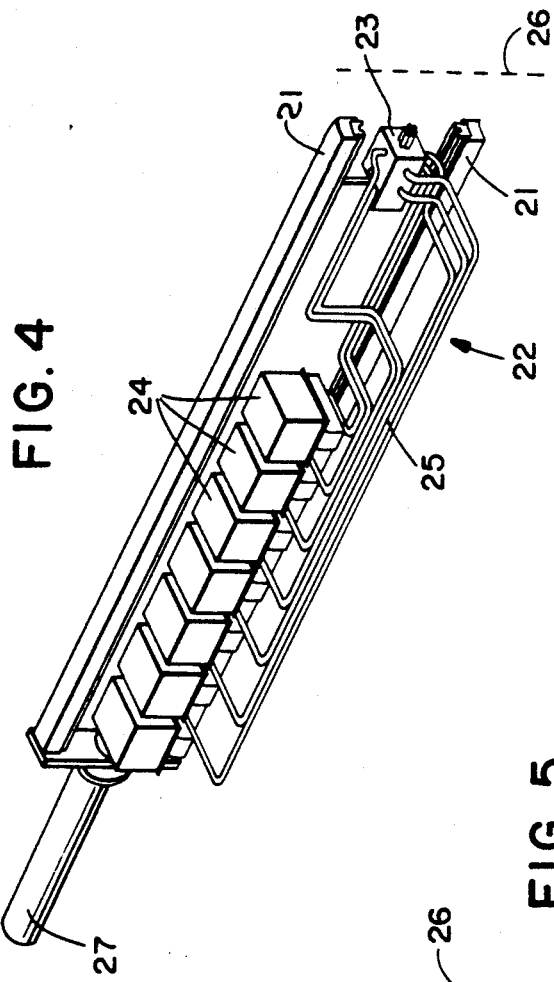
FIG. 4 is a perspective view of an impregnation unit of the assembly of FIG. 3 with the impregnation nozzle unit in the retracted position withdrawn from the bale exterior surface.

One embodiment of an impregnation unit incorporating nozzle assemblies with attendant control valves supported on the tier structure is illustrated in FIGS. 3, 4, 5 and 6. First referring to FIG. 3, each of the two tiers 17 located on opposite sides of the conveyor 15 have vertically and horizontally extending framing ribs 19, 19a supported on base members 20 on which pairs of slotted slide members 21 are mounted in vertically spaced arrays to extend transversely of and away from both sides of the conveyor 15 with a liquid injection unit movably supported between each pair of slide members 21. As best seen in FIG. 4, each liquid injection unit 22 comprising a nozzle assembly 23 and associated control valves 24 with connecting conduits 25 is slidably mounted between a pair of slide members 21 for movement of the injection unit 22 with nozzle assembly 23 between the retracted position of FIG. 4 withdrawn from the bale exterior surface (represented by the vertical dashed line 26) and the extended position of FIG. 5 in which the faces of the nozzle units 28 are in substantial contact with or at least in close adjacency to the bale surface 26 upon actuation of a pneumatic or hydraulic piston and cylinder arrangement 27 (of the injection unit 22). Two pairs of liquid injection, i.e., jet producing, units 22 in a vertical array on each of the tiers 17 are illustrated, however, one or three or more such units can be utilized in each tier depending upon the size and the nature of the baled waste material or a series of adjacent tiers could be utilized should the speed at which the bales are processed require. Obviously other arrangements are possible to bring the bale exterior surface and the faces of the nozzle units 28 into close adjacency, such as moving the bales.

Figure 5:
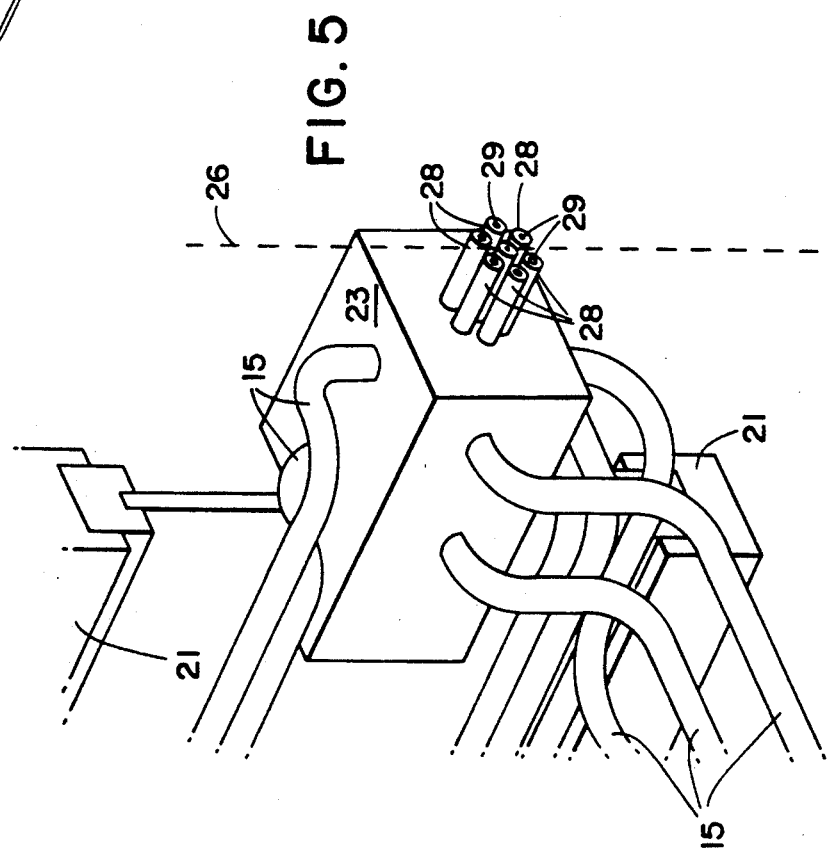
FIG. 5 is a perspective view of a portion of the unit of FIG. 4 in the extended position.

As best seen in FIG. 5, the nozzle assembly 23 comprises a cluster of seven nozzle units 28 each connected through conduits 15 to an actuating valve 24 so that a selected one or combination of the selected nozzle units are operable at a time. The end of each nozzle unit contains an orifice opening 29 drilled to a different size exit diameter. Referring to the schematic diagram of FIG. 6, each of the valves 24 connects to a manifold 30 receiving the discharge from a constant displacement high pressure pump 31. The back pressure generated by the area of the orifice opening 29 of each nozzle unit 28, that is connected through its controlling valve 24 and the manifold 30 to the positive displacement pump 31, determines the velocity of the jet stream 12 directed against the side surface of and penetrating into the bale, i.e., the smaller the orifice area size, the greater is the velocity of the jet stream discharged from the nozzle unit, but the volume rate of flow from each of the different size orifices is the same. A chemical concentrate can be added to the liquid in the manifold 30 through a valve 32 if treatment chemistry is desired in the recycling operation.

Figure 6:
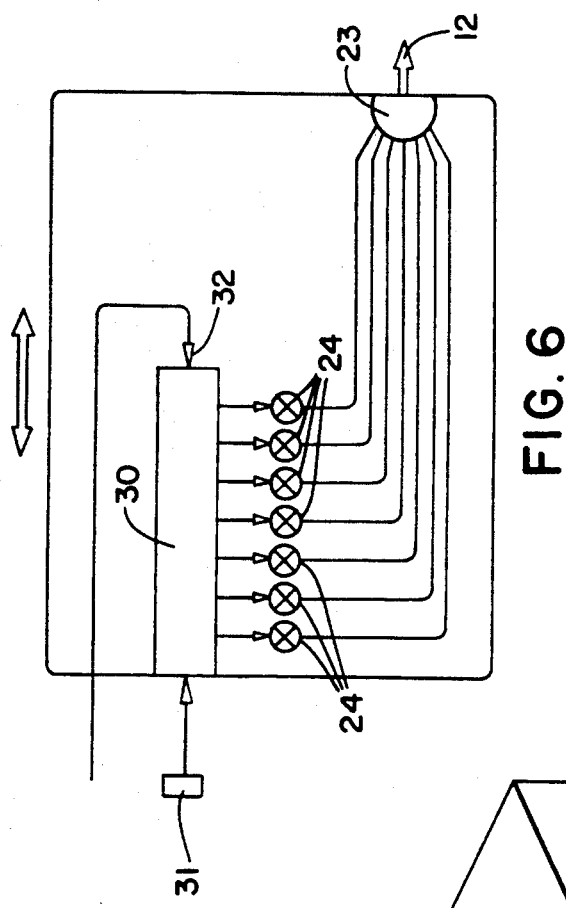
FIG. 6 is a schematic diagram of the valving controls of the unit of FIG. 4.
Figure 7:
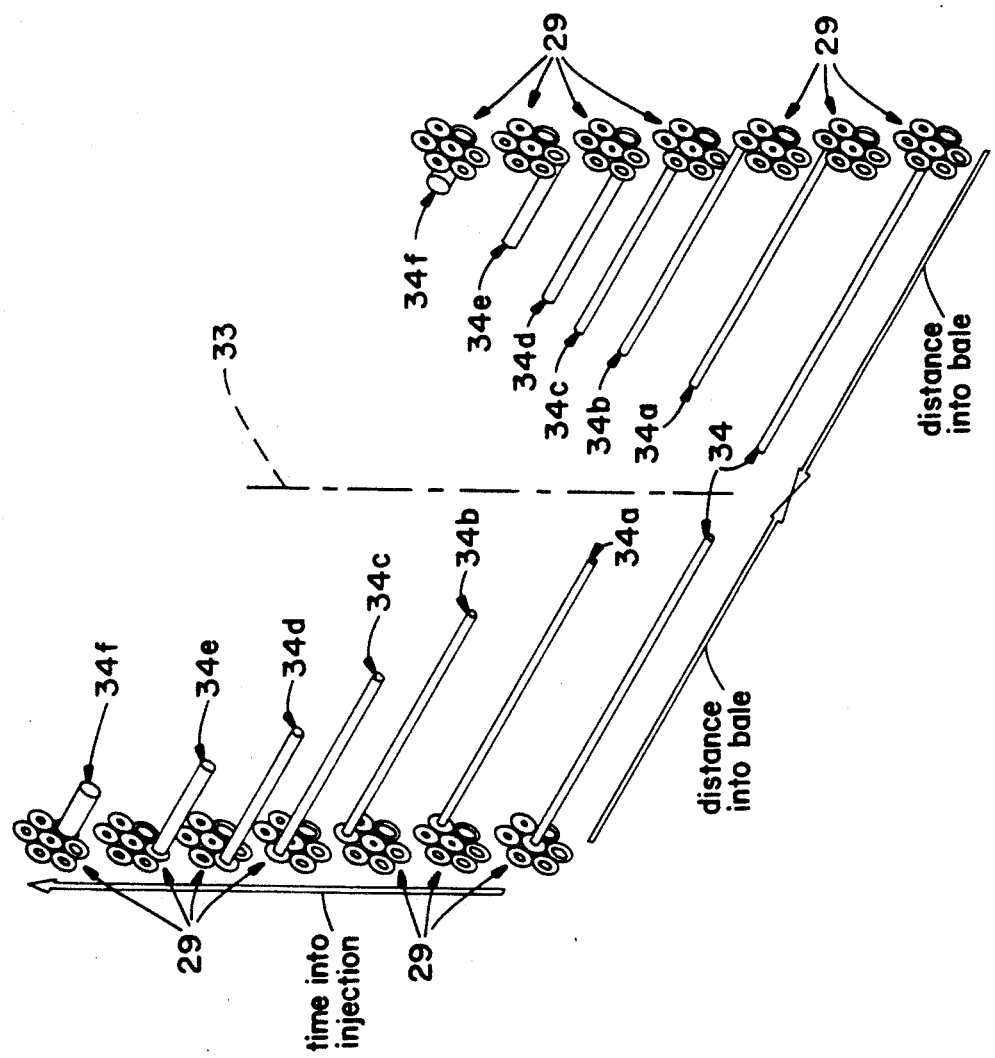
FIG. 7 is a schematic, graphical representation of the mode of liquid impregnation of the apparatus of FIG. 4.

As previously noted, improved saturation results have been found to exist by establishing a program of sequentially cycling the velocities of the nozzle unit jet streams injected into the bale such that each area of jet stream injection results in a timewise series of penetrations of varying velocity flows into the bale interior at a constant volume rate of flow during the period the nozzle units 28 are in the extended position. In general, the best results are achieved by programming the valves 24 through a controller (not illustrated) to initiate flow to the nozzle unit 28 having the smallest orifice size (highest back pressure and discharge velocity) when the nozzle assembly is moved to extended position which establishes penetration boring a hole to approximately the bale mid-plane followed by initiating flows sequentially to nozzle units having larger orifice sizes (lower velocities) in the order of decreasing velocities during the injection period. A schematic, graphical representation of the sequential, varying velocity constant volume rate of flow resulting from a seven nozzle unit nozzle assembly and valving arrangement illustrated in FIGS. 4-6 is best understood by reference to FIG. 7. The schematic graphical illustration of FIG. 7 contains representations of the seven orifice openings 29 of a pair of nozzle units 28 located on opposite sides of the bale mid-plane 33 in which the abscissa coordinate lengths of the individual representations 34, 34a, 34b, 34c, 34d, 34e, 34f of the seven jets, each of which is emitted sequentially from each of the varying size orifice openings and illustrated by the seven jet representations extending along each of the ordinate coordinates, represent the velocities at which each jet penetrates into the bale interior dependent upon the orifice back pressure. The diameters of the individual jet representations 34, 34a, 34b, 34c, 34d, 34e, 34f represent the respective orifice sizes and the volume size of each of the seven jet representations is equal as representing the volume rate of discharge from each different size orifice. Thus, it can be see that the initial high velocity jets 34 penetrate most deeply into the bale with circumferential seepage of fluid from the hole bored by the jet as its forwardly directed kinetic energy is largely dissipated. Sequentially initiated, decreasingly lower velocity jets follow of which each subsequent jet requires less velocity to penetrate to the depth initiated by the initial and prior higher velocity jets, thereby continuing to expand the wetted area circumferentially of the initial hole generated by the initial jet during the injection period prior to withdrawing the nozzle assembly 23 to the retracted position. Although sequentially reducing the velocity of the injected jets from a high to a low velocity often would be the optimum procedure, actuating each of the nozzle units of each assembly in a different sequence, or simultaneously activating combinations of more than one nozzle unit of each nozzle assembly might produce better saturation in bales having different types of waste material and degrees of compression. In some instances continued actuation of one nozzle unit during the injection period might establish adequate wetting of the baled waste material.

Figure 9:
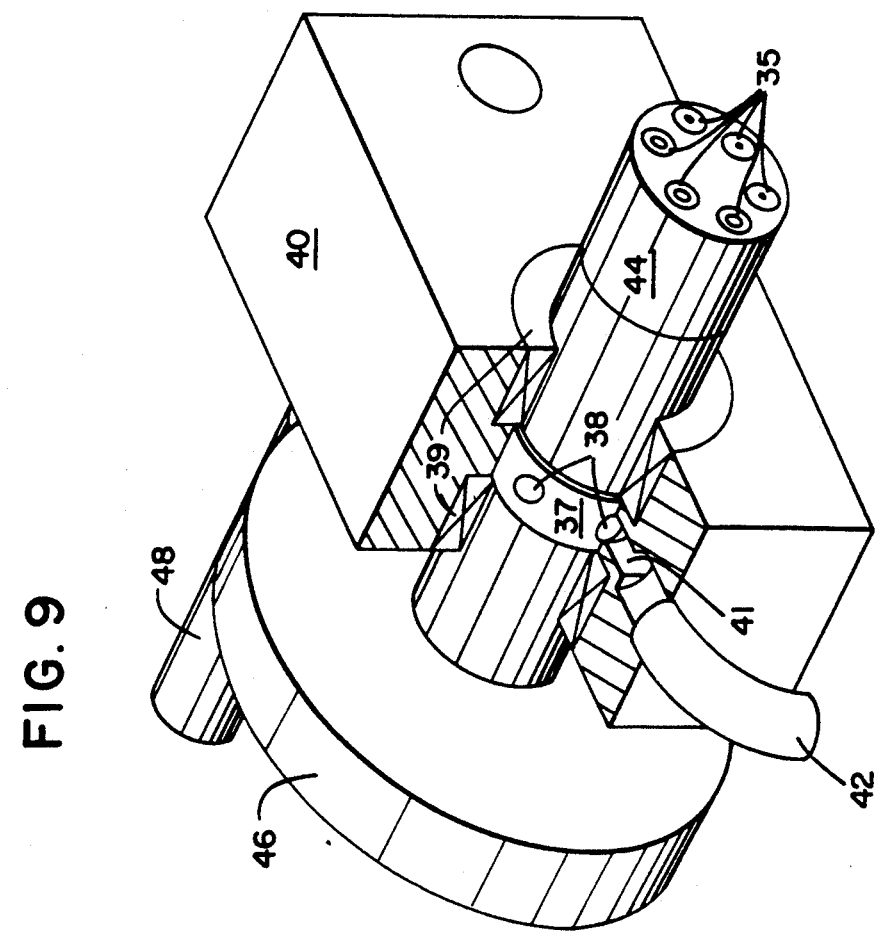
FIG. 9 is a perspective view of the assembled unit of FIG. 8.
Figure 8:
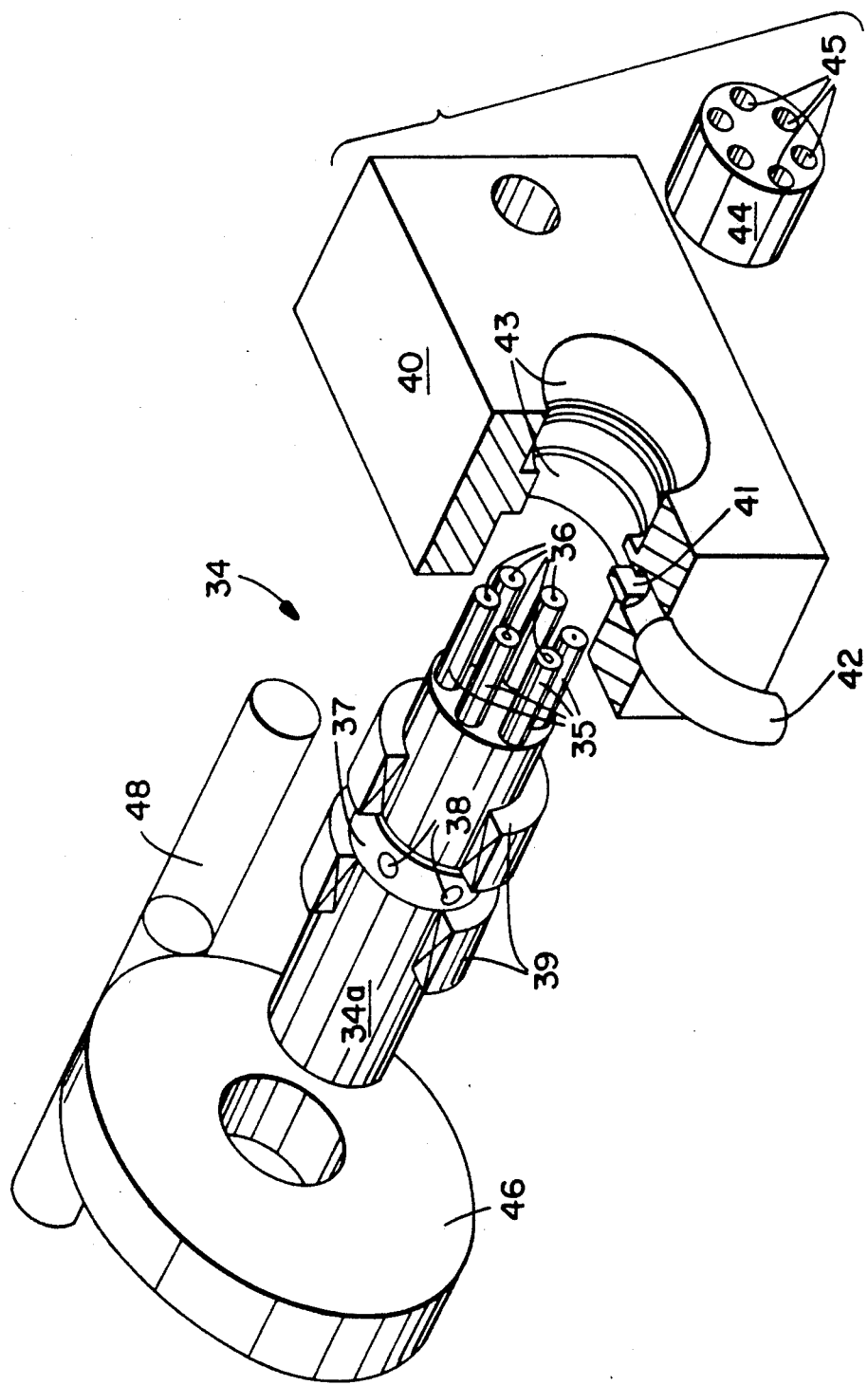
FIG. 8 is an exploded perspective view of a second embodiment of a bale fluid impregnation unit.

A further nozzle assembly embodiment is illustrated in FIGS. 8 and 9 in which the banks of individual valves for each nozzle unit, as illustrated in FIGS. 3 and 4, can be eliminated and a single valve (not illustrated) can control the multiple nozzle units of each nozzle assembly. Referring first to FIG. 8, the nozzle assembly 34 with six individual nozzle units 35 each having a different diameter end orifice 36 and extending forwardly of the nozzle assembly shaft 34a has a feed band 37 circumscribing the central portion of the shaft 34a with the band containing six openings 38 spaced apart around the circumference of the band, each opening respectively connected to one of the six nozzle units 35. A pair of sealing rings 39 are located on each of side of the feed band 37. The nozzle assembly 34 is rotatably mounted within a nozzle block 40 with the feed band 37 in communication with a feed opening 41 of the nozzle block connected by a conduit 42 to a positive displacement pump through a control valve (both not illustrated) in which each of the sealing rings 39 respectively lie in grooves 43 in the nozzle block. A cap 44 with nozzle unit end openings 45 fits over the nozzle units 35. A spur gear 46 (gear teeth not illustrated) at the inner end of the nozzle assembly shaft 34a contacts the gear teeth (not illustrated) of a drive shaft 48 in which the respective gear ratios are such that one revolution of the drive shaft 48 rotates the spur gear 46 and the shaft 34a of the nozzle assembly one-sixth of a revolution such as will bring each of the six openings 38 of the feed band 37 and the six nozzle units 35 successively into communication with the nozzle block feed opening 41 for each revolution of the drive shaft 48. Each nozzle block 40 and nozzle assembly and components are supported on a tier at the impregnation station for horizontal movement between extended and retracted positions into and out of close adjacency contact with the bale exterior surface in much the same manner as described for the nozzle assemblies of FIGS. 3, 4 and 5. By rotating the drive shaft 48 through successive single or multiple revolutions selected diameter orifices 36 can be brought into communication with the pump during the injection period when the nozzle assembly 34 is in the extended position and provide sequential injections at different velocities in the same manner as the installation described in FIGS. 3-7. This described embodiment in which the nozzle assembly 34 is rotationally mounted to place each nozzle unit orifice 36 at the same location with respect to the bale exterior surface at the time of ejecting liquid could sometimes be superior to the embodiment of FIG. 5 since the liquid from each sequential injection is into the same initially bored hole and the results described with respect to FIG. 7 involving sequential seepage might be better for some waste material.

Figure 11:
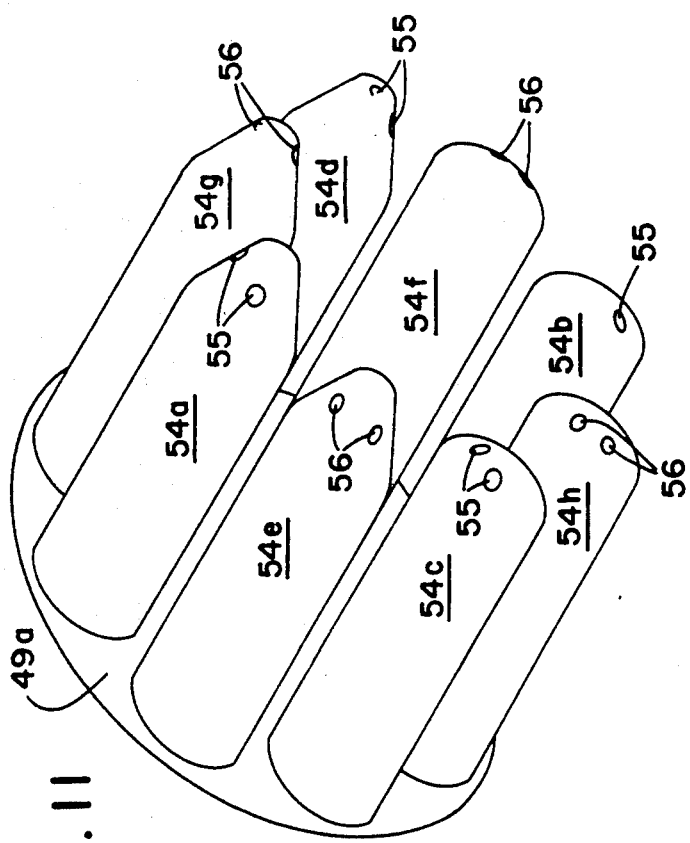
FIG. 11 is a perspective view of a portion of the unit of FIG. 10.

The previously described nozzle assembly embodiments, in which the outer end surfaces of the nozzle units and orifice openings are parallel to the exterior side surfaces of the bales to establish jet streams that penetrate into the bale normal to its exposed exterior side surfaces, are suitable for bales in which the waste material is layered to be parallel to the bale side surfaces. However, other bales have the waste material layered to be normal to the bale exterior side surfaces so that the direction of the injection jets from the described embodiments would be parallel to the bale layers, thereby penetrating completely through the bale to exit from the other side with little diminition in velocity and saturation of the waste material in the bale. For this type of bale in which the layers are perpendicular to the bale's side surfaces, a modification of the nozzle assembly embodiment of FIGS. 8 and 9 is illustrated in FIGS. 10 and 11 as will direct the jets obliquely of the exterior bale side surfaces and the individual layers of waste material within the bale in a manner to establish a component of the jet velocity normal to the waste material layers. The nozzle assembly 49 of this embodiment includes an assembly shaft 49a of which the rear end is fitted to a spur gear 50 (gear teeth not illustrated) in contact with the gear teeth of a drive shaft 51 (teeth not illustrated) and in which the gear ratios are such that one rotation of the drive shaft rotates the spur gear 51 and the nozzle assembly one-eighth of a revolution. A feed band 52 extends circumferentially of the central portion of the nozzle shaft 49a between a pair of sealing rings 53 on either side and eight nozzle units 54 comprising individual nozzle units 54a, 54b, 54c, 54d, 54e, 54f, 54g, 54h arranged in a circumferential array to protrude forwardly of the nozzle assembly shaft 49a, as best seen in FIG. 11. Opposite circumferentially located nozzle units 54a and 54b of the array lie in a vertical plane, oppositely located nozzle units 54c and 54d lie in a horizontal plane and oppositely located nozzle units 54e and 54f and oppositely located nozzle units 54g and 54h lie in respective planes extending crosswise at 45° to the horizontal and vertical planes. Each of the nozzle units has a pair of equal size orifices on dome shaped end face surfaces in which the pair of orifices 55 on the end faces of each of the upper and lower nozzle units 54a, 54b in the vertical plane and the pair of orifices 55 on the end faces of each of the nozzle units 54c, 54d in the horizontal plane are larger than the pair of orifices 56 on the end faces of each of the upper and lower nozzle units 54e, 54f, 54g, 54h located in each of the 45° crosswise extending planes. The end face surfaces of the upper top nozzle unit 54a of the vertical array and the nearest nozzle unit 54c of the illustrated horizontal array are bowed to such a degree and the pair of orifices 55 of each are located on the end face surfaces at a location such that the pairs of orifices 55 face upwardly to subtend acute angles (approximateing 45° or more or less) with the horizontal and the respective orifices 55 of the pair of nozzle units 54a and 54c face to the left and right of the nozzle unit's central axis at an acute angle (approximating 60° or more or less), as will establish from each of the nozzle units 54a and 54c a pair of diverging jets directed upwardly and obliquely outwardly of the vertical plane normal to the longitudinal axis of the array of nozzle units 54. The dome shaped end face surfaces of the lower nozzle unit 54b in the vertical array and the other nozzle unit 54d in the horizontal array are bowed to the same degree and the pairs of orifices 55 of each are located such that they face downwardly the same degree as the orifices 55 of units 54a and 54b face upwardly and the orifices 55 of each of the nozzle units 54c and 54d similarly face left and right of the nozzle units' central axes, as will establish pairs of diverging, obliquely directed jets in the downward direction. The domed end face surfaces of the crosswise extending nozzle units 54e, 54f, 54g, 54h are bowed to the same degree and the pairs of orifices 56 of each are located in the same manner that the orifices of each have the same alignment as described for nozzle units 54a, 54b, 54c, 54d when the crosswise extending nozzle units are rotated 45° to occupy the same positions as is illustrated with the nozzle units 54a, 54b, 54c, 54d. Each of the eight nozzle units 54 and their end orifices respectively connect to one of the eight feed band openings 57 that are equally spaced around the circumference of the feed band 52. Each end portion 60 of the circular bore 58 extending through the nozzle block 59 is enlarged to accommodate the sealing rings 53. A hollow feed channel 61, within the nozzle block circumscribing the bore 58 and midway of the bore, connects to a conduit 62 leading to a pump through a control valve (neither illustrated). Four feed channel openings 63 are equally spaced around the feed channel perimeter such that two opposite pairs of the openings 63 are in communication with two oppositely located pairs of the feed band openings 57 whereby the orifices of four of the nozzle units 54 are pressurized from the pump at a time. As in the precedingly described embodiment a cap 64 with nozzle unit openings 65 fits over the end portions of the nozzle units and the nozzle assembly is supported at an impregnation station tier for movement into and out of contact with the exterior side of a bale as in the other embodiments. By sequentially rotating the drive shaft 51 one revolution in different or the same directions through actuation of a controller (not illustrated) the respective nozzle units 44 are positioned to establish a pattern of four pairs of jet streams injected into the bale at oblique angles with respect to the bale opposite side surfaces at varying sequential high and low velocities as the alternately smaller orifices 56 and the larger orifices 55 of the adjacent nozzle units 54 are pressurized by the pump when the nozzle assembly 49 is in the extended position.

Figure 12:
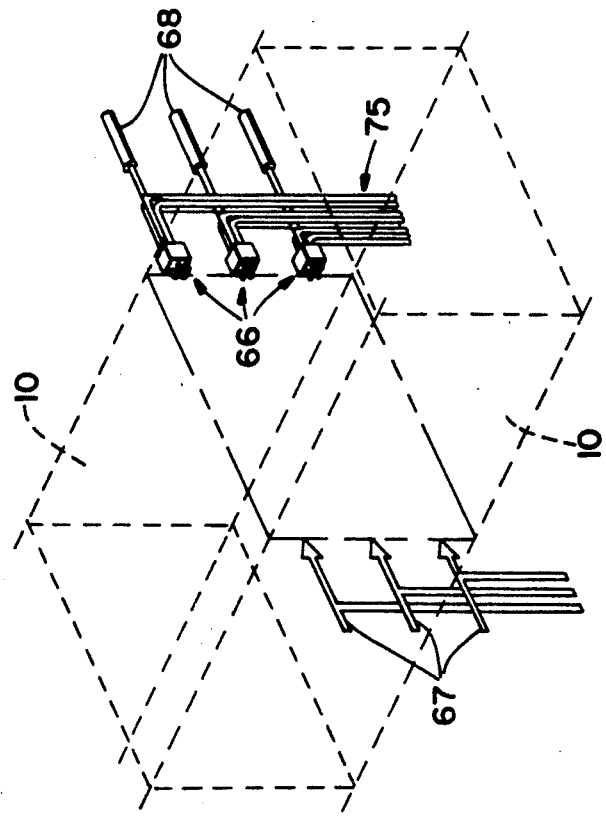
FIG. 12 is a perspective view of a fourth embodiment of a bale fluid impregnation assembly.
Figure 13:
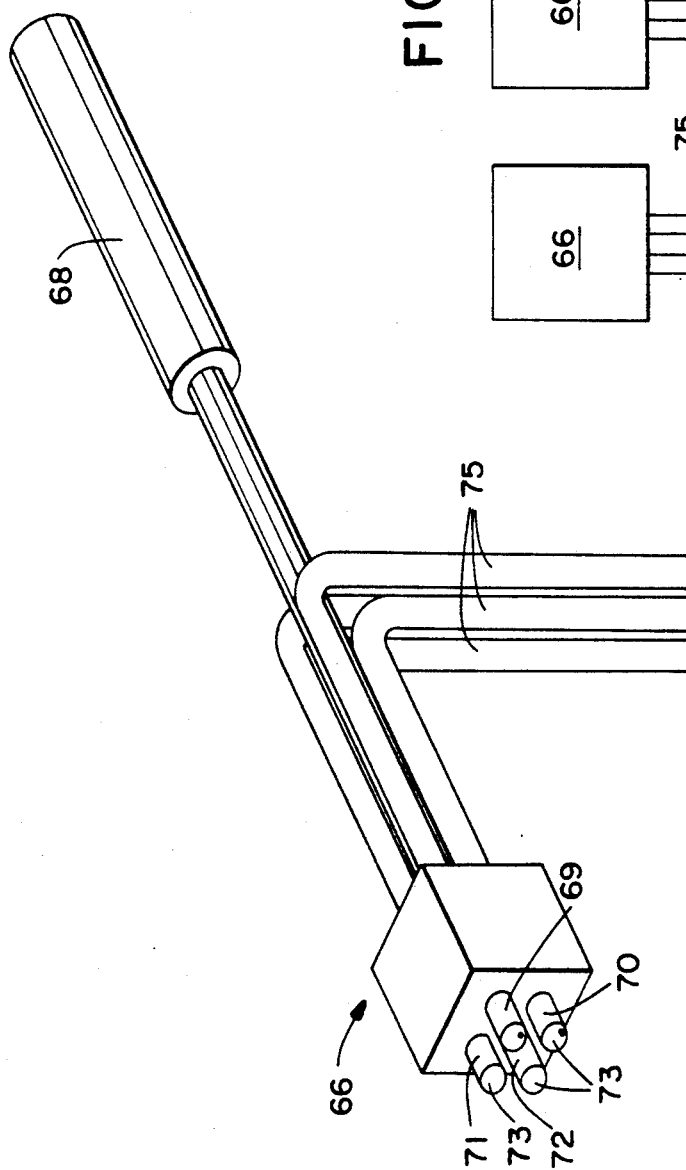
FIG. 13 is a perspective view of an impregnation unit of the assembly of FIG. 12.

A preferred nozzle assembly embodiment supported at an impregnation station 17 of the nature illustrated in FIG. 2, is shown in FIGS. 12, 13 and 14 in which a vertical array of nozzle assemblies 66 are supported in each of two opposing tiers for horizontal movement between extended and retracted positions into and out of closely adjacent contact with the opposite side surfaces of bales 10, the arrows 67 in FIG. 12 representing the corresponding nozzle assemblies 66 and their piping connections illustrated in the opposite tier. Each nozzle assembly 66 is supported by tier structure in an equivalent manner as the nozzle assemblies of FIGS. 3 and 4 for movement between extended and retracted positions relative to the bale 10 by means of a hydraulic or pneumatic piston and cylinder arrangement 68 or equivalent provisions. Referring now to FIGS. 13 and 14, each nozzle assembly 66 comprises a pair of forwardly protruding, vertically spaced nozzle units 69, 70 on one side of the nozzle assembly 66 and a pair of forwardly protruding, vertically spaced nozzle units 71, 72 on the other side of the nozzle assembly 66, each nozzle unit having a similar dome shaped end face 73 and connected by the conduit 75 to a pump through a control valve (neither illustrated). Equal diameter orifices 74 are located on the horizontal equator line 76 (illustrated with respect only to nozzle unit 71) of each nozzle unit dome shaped end face 73 and are offset outwardly from the vertical centerline of nozzle assembly a distance from the center of the nozzle face 73 such that the jet from each orifice and the nozzle unit longitudinal axis subtend a horizontally aligned, acute angle, the subtended angle A of the jets of the uppermost nozzle units 69, 71 being greater than the subtended angle B of the jets of the lowermost nozzle units 70, 72, e.g., 60° and 30° respectively. The described angular alignment of the jet streams is typical of one embodiment only and numerous variations are possible in establishing a pattern of jet streams that are directed obliquely of the face of the bale to penetrate obliquely and fanwise into the bale interior. When the baled material being processed is layered parallel to the bale side surfaces, the front faces of each nozzle unit of this presently described embodiment preferably would be flat with the orifice in the central area of the face so the jets would be discharged outwardly parallel to the central axis of the nozzle unit to penetrate the bale normal to its layers.

Since the orifices of all nozzle units of all assemblies are of equal size, each nozzle unit connected singly to the pump will establish the same back pressure such that the emitted jet will be of maximum velocity. Connecting multiple nozzle units to the pump at one time increases the total orifice area through which the pump discharges, thereby lowering the back pressures established at each orifice and decreasing the velocities of the emitted jets. For example, the back pressure of N single orifice units of the nature described above with an orifice diameter size 0.1091" connected to a pump establishing a flow of 54 gpm is as indicated in the following table:

| N | Back Pressure (psig) |
|---|---|
| 2 | 6,000 |
| 3 | 2,667 |
| 4 | 1,500 |
| 6 | 667 |
| 8 | 375 |
| 12 | 167 |

Figure 15:
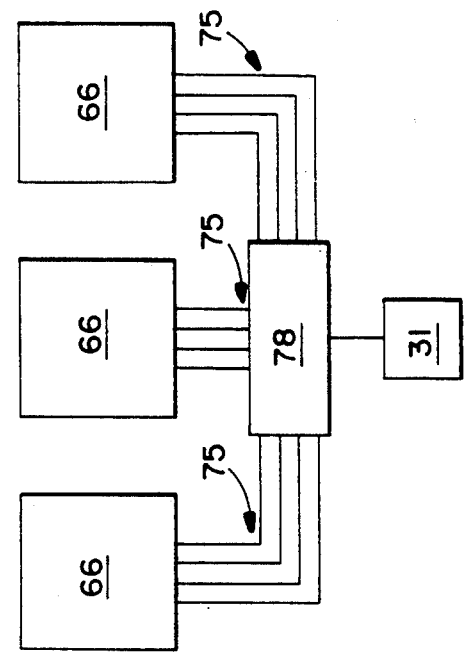
FIG. 15 is schematic diagram of a flow control valving arrangement for the embodiment of FIGS. 12-14.

For creating a sequence of varying velocity jets penetrating into the side of the bale, individual or ganged valves controlling the flow in the conduits between a pump 31 and the nozzle units of the nozzle assemblies 66 in each tier can be sequenced by a controller 78, as illustrated in FIG. 15 for varying schedules as will sequentially connect varying numbers of orifices of the individual nozzle units of the nozzle assemblies to the pump for different intervals of the total time period of each fluid injection while the nozzle assemblies are in the extended position. For example, in the disclosed embodiment of FIGS. 12, 13 and 14 totaling twelve nozzle units in the three vertically disposed nozzle assemblies of each tier, two nozzle units at a time from each of the three nozzle assemblies of a tier would be pressurized sequentially for five seconds in producing six sequential jet injections from two nozzle units at a time having a 6,000 psig back pressure with this followed by pressuring three nozzle units at a time sequentially for five seconds from the three nozzle assemblies in producing four sequential jet injections from three nozzle units at a time having a back pressure of 2,667 psig. Another impregnation schedule could be pressurizing two nozzle units at a time sequentially for four seconds from each of the three nozzle assemblies in producing six sequential jet injections from nozzle units having a 6,000 psig back pressure, followed by pressurizing three nozzle units at a time sequentially for four seconds from the three nozzle assemblies in producing four sequential jet injections from nozzle units having a 2,667 psig back pressure and followed by pressurizing six nozzle units at a time sequentially for five seconds from the three nozzle assemblies in producing three sequential jet injections from nozzle units having a 667 psig back pressure. Obviously, the back pressure of the nozzle units can be varied by modifying the diameter of the orifices. The sequence scheduling of the valve controller can be varied as will establish maximum bale saturation depending upon the nature of the waste material in the bales as well as the number of injections into the bale at each location and the spacing between adjacent areas along the length of the bale into which liquid is injected.

It should be understood that the foregoing disclosure involves typical embodiments of the invention and that numerous modifications or alterations may be made therein without departing from the spirit and scope of the invention as set forth in the appendant claims.

What we claim is:

1. In a method of recycling wastepaper contained in waste material packaged as a bound bale by subjecting the waste material to defibration pulping and sorting operations for recovering cellulosic fibers of the wastepaper, the improvement comprising the steps of:

bringing a jet producing orifice of nozzle means and an exterior surface of said bound bale of waste material into intimate association, discharging a jet of cellulosic fiber softening and swell-inducing liquid from said nozzle means orifice at a sufficiently high velocity and flow as establishes penetration of said liquid jet a substantial distance into the interior of said bound bale, following said jet penetration continuing to discharge said liquid from said nozzle means orifice into said bale at a velocity and flow for a time period as results in waste material within the interior of said bale becoming wetted with said liquid, and subsequent to said time period maintaining said bale of wetted waste material in a quiescent state for the time required for said liquid wetted waste material of said bale to sorb sufficient wetting liquid as results in the wastepaper cellulosic fibers of said bale softening and swelling prior to subjecting the waste material of said blade to defibration pulping of the cellulosic fiber recovery operation.

2. In the method of claim 1, the improvement wherein the velocity of said liquid continuing discharge from said nozzle means orifice varies during said time period required to wet the waste material within the interior of said bale.

3. In the method of claim 2, the improvement wherein the velocity of said liquid continuing discharge from said nozzle means orifice is varied during separate intervals of said time period required to wet the waste material within the interior of said bale.

4. In the method of claim 3, the improvement wherein the velocity of said liquid continuing discharge from said nozzle means orifice is decreased during sequential ones of said time period separate intervals.

5. In a method of recycling wastepaper contained in waste material packaged as a bound bale by subjecting the waste material to defibration pulping and sorting operations for recovering cellulosic fibers of the wastepaper, the improvement comprising the steps of:

bringing a plurality of adjacently arranged jet producing orifices of nozzle means and an exterior surface of said bound bale of waste material into intimate association, discharging a jet of cellulosic fiber softening and swell-inducing liquid from selected ones of sad nozzle means orifices at a sufficiently high velocity and flow as establishes penetration of said liquid jet a substantial distance into the interior of said bound bale, following said jet penetration continuing to discharge said liquid from said selected nozzle means orifices into said bale at a velocity and flow for time periods as results in waste material within the interior of said bale becoming wetted with said liquid, and subsequent to said time periods maintaining said bale of wetted waste material in a quiescent state for the time required for said liquid wetted waste material of said bale to sorb sufficient wetting liquid as results in the wastepaper cellulosic fibers of said bale softening and swelling prior to subjecting the waste material of said bale to defibration pulping of the cellulosic fiber recovery operation.

6. In the method of claim 5, the improvement wherein said liquid is discharged from each of said selected ones of said nozzle means orifices at a different velocity.

7. In the method of claim 6, the improvement wherein said liquid is discharged from each of said selected ones of said nozzle means orifices at decreasing velocities during sequential intervals of said time period required to wet the waste material within the interior of said bale.

8. In the method of claim 5, the improvement wherein said liquid is discharged sequentially from each of a plurality of sets of said selected ones of said nozzle means orifices in which each said set comprises different ones of said plurality of nozzle means orifices.

9. In the method of claim 8, the improvement wherein said liquid is discharged sequentially from each said set of selected ones of nozzle means orifices at decreasing velocities.

10. In the method of any one of claims 1-9 in which the waste material is packaged in bound bales comprising successive layers of waste material, the improvement wherein said liquid is discharged from each said nozzle means orifice in a direction substantially normal to the waste material layers.

11. In the method of any one of claims 1-9 in which the waste material is packaged in bound bales comprising successive layers of waste material, the improvement wherein said liquid is discharged from each said nozzle means orifice in a direction inclined at an angle to the plane of the waste material layers.

12. In the method of any one of claims 1-9, the improvement wherein opposite exterior surfaces of said bale are subjected to an inwardly directed pressure force subsequent to said time period required to wet the waste material within the interior of said bale and prior to initiating the defibrating pulping operation, whereby the liquid sorbed by the wastepaper is redistributed.

13. An improvement in a method of recycling wastepaper contained in waste material packaged as a bound bale in which the waste material of said bale is introduced into a container holding an aqueous solution and the mixture of waste material and aqueous solution agitated in establishing defibration of the cellulosic fibers of the wastepaper for their subsequent separation and recovery, wherein the improvement comprises the steps of:

prior to introducing said waste material of said bound bale into the defibrating container, an exterior surface of said bound bale of waste material and a jet producing orifice of nozzle means connected to a pressurized source of fiber softening and swell-inducing liquid are brought into intimate association, a jet of said liquid is discharged into said waste material bound bale from said nozzle means orifice at a sufficiently high velocity and flow as bores a hole extending a substantial distance into the interior of said bale, continuing to discharge said liquid from said orifice into said hole at a velocity and flow for a period of time as results in said waste material throughout said bale becoming wetted with said liquid, and maintaining said wetted waste material of the bale in a quiescent state for such a period as allows the wastepaper of said wetted waste material to sorb sufficient wetting liquid as establishes a desired degree of softening and swelling of the cellulosic fibers of said wetted wastepaper.

14. The improvement of claim 13 wherein said liquid continues to be discharged from said nozzle means orifice into said hole at different velocities during separate portions of said time period required to wet said waste material of said bale.

15. The improvement of claim 14 wherein said liquid continues to be discharged from said orifice into said hole at decreasing velocities during sequential ones of said separate portions of said time period required to wet said waste material of said bale.

16. The improvement of claim 13 wherein said nozzle means comprises a plurality of jet producing orifices from each of which the discharge of a high velocity jet of said liquid into said bale bores a hole extending a substantial distance into the interior of said bale and said liquid continues to be discharged from each of said plurality of orifices into said holes at different velocities during separate portions of said time period required to wet said waste material of said bale.

17. The improvement of claim 16 wherein said liquid continues to be discharged from each of said plurality of orifices into said holes at decreasing velocities during sequential ones of said separate portions of said time period required to wet said waste material of said bale.

* * * * *